(12) United States Patent
Kim et al.

(10) Patent No.: US 8,670,108 B2
(45) Date of Patent: Mar. 11, 2014

(54) HIGH RESOLUTION TIME-OF-FLIGHT DISTANCE MEASUREMENT DEVICE BASED ON FEMTOSECOND LASER

(75) Inventors: Seung Woo Kim, Daejeon (KR); Joo Hyung Lee, Daejeon (KR); Young Jin Kim, Changwon-si (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 209 days.

(21) Appl. No.: 13/253,484

(22) Filed: Oct. 5, 2011

(65) Prior Publication Data

US 2012/0086932 A1    Apr. 12, 2012

(30) Foreign Application Priority Data

Oct. 11, 2010  (KR) .................. 10-2010-0098937

(51) Int. Cl.
*G01C 3/08*   (2006.01)
(52) U.S. Cl.
USPC ................... 356/5.01; 356/3.01; 356/4.01
(58) Field of Classification Search
USPC ............ 356/3.01–3.15, 4.01–4.1, 5.01–5.15, 356/6–22, 28, 28.5, 139.01–139.1
See application file for complete search history.

(56) References Cited

U.S. PATENT DOCUMENTS 6,552,799 B1 *   4/2003   Wright et al. ................ 356/497

* cited by examiner

*Primary Examiner* — Luke Ratcliffe
(74) *Attorney, Agent, or Firm* — Sherr & Jiang, PLLC

(57) ABSTRACT

Disclosed is a high resolution time-of-flight distance measurement device based on a femtosecond laser, including a femtosecond laser light source, a polarization beam splitter, a balanced optical cross-correlator in which second harmonic pulses are generated using reference light and measurement light, wherein the second harmonic pulse that was primarily generated is incident on a first photodetector and the second harmonic pulse that was secondarily generated is incident on a second photodetector, so that a difference in intensity of the second harmonic pulses is output, thus resolving the time interval of the pulse laser, a controller for controlling the repetition rate of the femtosecond laser, and a converter for measuring the repetition rate of the femtosecond laser controlled so that the pulses uniformly overlap by means of the controller, using a frequency counter traceable to a time/frequency standard, so that a measured value is converted into distance information.

7 Claims, 4 Drawing Sheets

HIGH RESOLUTION TIME-OF-FLIGHT DISTANCE MEASUREMENT DEVICE BASED ON FEMTOSECOND LASER

CROSS REFERENCE TO PRIOR APPLICATIONS

The present application claims priority under 35 U.S.C. §119 to Korean Patent Application No. 10-2010-0098937 (filed on Oct. 11, 2010), which is hereby incorporated by reference in its entirety.

BACKGROUND OF THE INVENTION

1. Technical Field

The present invention relates to a high resolution time-of-flight distance measurement device based on a femtosecond laser, and particularly to a time-of-flight distance measurement device which has a resolution of tens of μm for a distance measurement range of tens of m to hundreds of km.

2. Description of the Related Art

According to the principle used to measure the distance of an object located at a predetermined position using a pulse laser, pulse laser light is radiated onto the object and then the period of time required for the light scattered by the object to return is measured to determine the distance. The instant peak power of such a method of measuring the distance of an object using the pulse laser is higher than that of a method of measuring distance using a continuous wave laser, thus enabling long-distance measurement and achieving a fast rate of measurement.

In the time-of-flight distance measurement using a pulse laser, the period of time between the point in time when, a pulse is emitted from a light source and the point in time at which the pulse is reflected from a target and comes back is measured, thereby determining a distance. The time-of-flight principle is used to measure a three-dimensional shape in huge manufacturing industries including shipbuilding and aircraft industries, and also is variously applied in ground-borne or airborne geodetic survey fields which are necessary for civil engineering and construction, and fields related to space development including satellite laser ranging (SLR), laser altimeters, and measuring the distance between satellites.

In recent years, however, in order to increase productivity in huge manufacturing industries such as shipbuilding and aircraft industries, the demand for measurement resolution of ones of mm or less over a measurement range of hundreds of m is increasing, and in the aerospace development field, the satellite constellation industry carried out mainly by the National Aeronautics and Space Administration (NASA) and the European Space Agency (ESA) requires distance measurement between satellites with a resolution of tens μm over a measurement range of hundreds of m. The time-of-flight distance measurement is advantageous because the distance may be measured over a long range of from ones of m to hundreds of km, but the reaction rate of a photodetector for resolving the time interval between pulses has a limitation of tens of ps, undesirably limiting the distance measurement resolution to the level of ones of mm. Hence, this measurement is difficult to utilize in application fields requiring a measurement resolution of ones of mm or less over a long measurement range.

SUMMARY OF THE INVENTION

Accordingly, the present invention has been made keeping in mind the problems encountered in the related art and an object of the present invention is to provide a high resolution distance measurement device based on a femtosecond laser, in which the time interval between pulses is on the order of ones of femtoseconds (fs) by overcoming the limitation of resolution in absolute distance measurement using the conventional time-of-flight principle.

In order to accomplish the above object, an aspect of the present invention provides a high resolution time-of-flight distance measurement device based on a femtosecond laser, comprising a femtosecond laser light source for emitting a femtosecond pulse laser; a polarization beam splitter for splitting light emitted from the femtosecond laser light source into reference light and measurement light having polarizations orthogonal to each other so that the reference light and the measurement light are directed to a reference mirror and a target object; a balanced optical cross-correlator on which the reference light reflected from the reference mirror and the measurement light reflected from the target object are incident in the form of coherent light and pass through a second harmonic generator to thus generate second harmonic pulses, of which the second harmonic pulse that was primarily generated is incident on a first photodetector, and the second harmonic pulse that was secondarily generated by passing orthogonal light pulses (including the reference light and the measurement light) back-reflected by a mirror through the second harmonic generator is incident on a second photodetector, so that a difference in intensity of the second harmonic pulses incident on the first photodetector and the second photodetector output, thus resolving the time interval of the pulse laser; a controller for controlling the repetition rate of the femtosecond laser to overlap laser pulses of the reference light reflected from the reference mirror and the measurement light reflected from the target object; and a converter for measuring the repetition rate of the femtosecond laser controlled so that the pulses uniformly overlap by means of the controller, using a frequency counter traceable to a time/frequency standard, so that a measured value is converted into distance information.

In this aspect, the distance measurement device may have a Michelson interferometer structure.

In this aspect, the balanced optical cross-correlator may comprise a first condensing lens and a second condensing lens provided at both sides of the second harmonic generator so that the reference light and the measurement light, which were reflected, are condensed and then incident on the second harmonic generator; a first dichroic mirror for separating the second harmonic pulse generated by the second harmonic generator, so that it is directed to the first photodetector; a mirror for back-reflecting the light pulses passed through the first dichroic mirror to the second harmonic generator; and a second dichroic mirror for separating the second harmonic pulse generated by passing the light pulses that were back-reflected by the mirror through the second harmonic generator, so that it is directed to the second photodetector.

In this aspect, the second harmonic generator may comprise a PPKTP (Periodically Poled Potassium Titanyl Phosphate).

In this aspect, the difference in distance between the reference mirror and the target object may be determined by an equation of $$\Delta L = m \frac{c}{2 f_r N}.$$

In this aspect, the frequency counter may measure a frequency traceable to a time/frequency standard using an atomic clock.

BRIEF DESCRIPTION OF THE DRAWINGS

The features and advantages of the present invention will be more clearly understood from the following detailed description taken in conjunction with the accompanying drawings, in which.

DESCRIPTION OF SPECIFIC EMBODIMENTS

Figure 1:
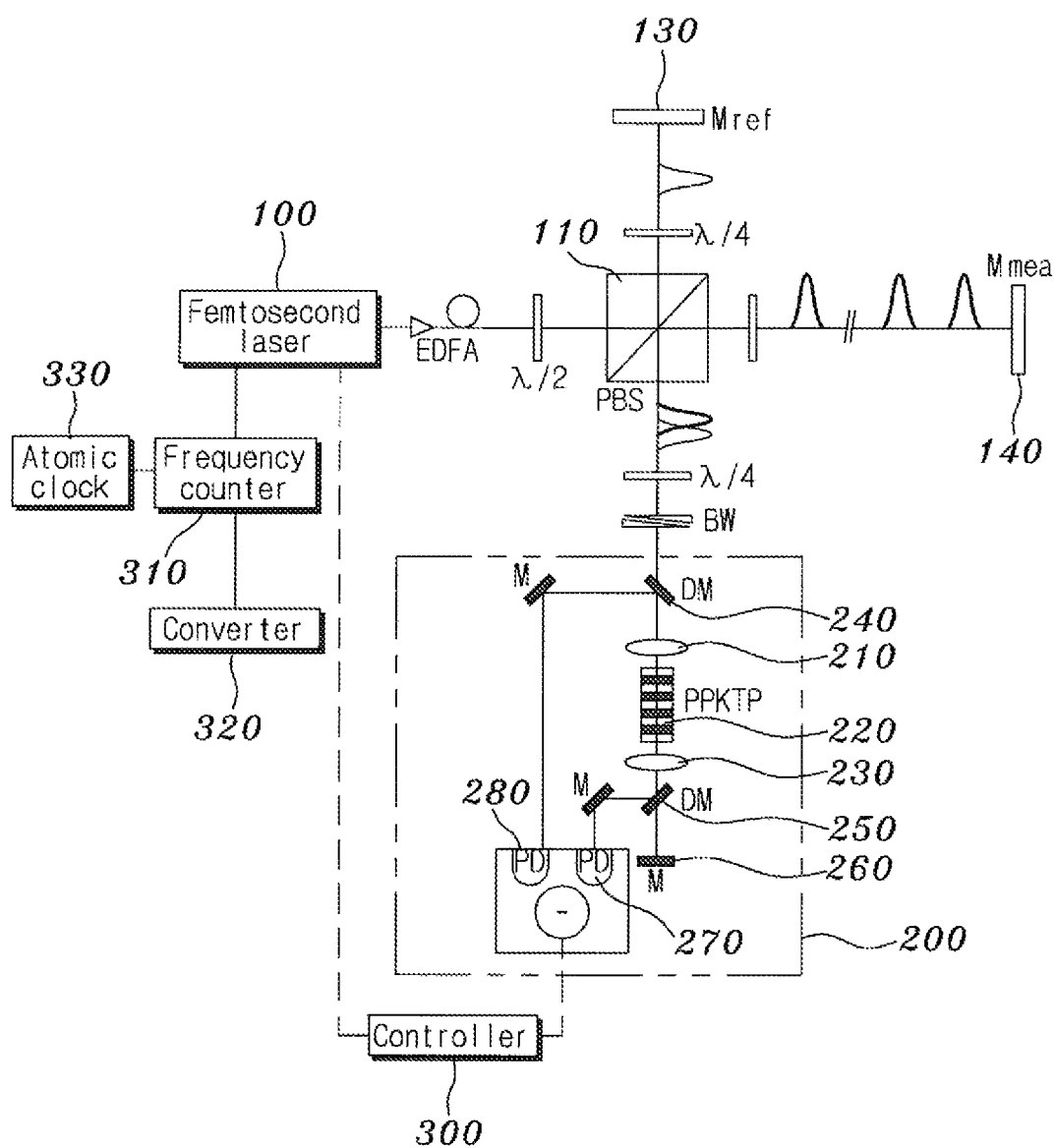
FIG. 1 is a schematic block diagram showing a high resolution time-of-flight distance measurement device based on a femtosecond laser according to the present invention.

Hereinafter, embodiments of the present invention regarding a high resolution time-of-flight distance measurement device based on a femtosecond laser will be described in detail while referring to the accompanying drawings.

According to the present invention, the high resolution time-of-flight distance measurement device based on a femtosecond laser comprises a femtosecond laser light source 100 for emitting a femtosecond pulse laser; a polarization beam splitter 110 for splitting light emitted from the femtosecond laser light source into reference light and measurement light having polarizations orthogonal to each other so that they are directed to a reference mirror and a target object; a balanced optical cross-correlator on which the reference light reflected from the reference mirror 130 and the measurement light reflected from the target object are incident in the form of coherent light and pass through a second harmonic generator to thus generate second harmonic pulses, in which the second harmonic pulse that was primarily generated is incident on a first photodetector, and the second harmonic pulse that was secondarily generated by passing the orthogonal light pulses (including reference light and measurement light) back-reflected by a mirror through the second harmonic generator is incident on a second photodetector, so that the difference in intensity of the second harmonic pulses incident on the first photodetector and the second photodetector is output thus resolving the time interval of the pulse laser; a controller for controlling the repetition rate of the femtosecond laser to overlap the laser pulses of the reference light reflected from the reference mirror and the measurement light reflected from the target object; and a converter for measuring the repetition rate of the femtosecond laser controlled so that the pulses uniformly overlap by means of the controller, using a frequency counter traceable to a time/frequency standard, so that it is converted into distance information.

The high resolution time-of-flight distance measurement device based on a femtosecond laser according to the present invention includes the balanced optical cross-correlator for generating second harmonic pulses to precisely resolve the time interval between femtosecond laser pulses, so that the time interval between the pulses is resolved to the order of ones of femtoseconds (fs), thus enabling precise distance measurement.

Also, in the high resolution time-of-flight distance measurement device based on a femtosecond laser according to the present invention, the repetition rate of femtosecond laser pulses is locked in the measurement distance using precise time interval resolution. Thereby, the distance is measured using the frequency, which is a measurable physical quantity that can be very precisely measured, thus drastically increasing the precision of measurement. Because results are produced based on a frequency standard, results traceable to the same standard all over the world may be obtained.

FIG. 1 is a schematic block diagram showing the high resolution time-of-flight distance measurement device based on a femtosecond laser according to the present invention. As shown in FIG. 1, the distance measurement device according to the present invention is largely composed of the femtosecond laser light source 100, the polarization beam splitter 110 for splitting light into reference light and measurement light, the balanced optical cross-correlator 200 on which the reference light and the measurement light are incident and pass through the second harmonic generator 220 thus generating second harmonic pulses which are then respectively input to two balanced photodetectors thus resolving the time interval between the pulses, and the controller 300 for controlling the repetition rate of the femtosecond laser.

According to an embodiment of the present invention, the femtosecond laser light source 100 is an optical fiber femtosecond laser having a center wavelength of 1550 nm, a bandwidth of 60 nm and a pulse width of 150 fs. The light emitted from the femtosecond laser light source is split into polarized beams orthogonal to each other by means of the polarization beam splitter 110, which are then respectively radiated onto the reference mirror 130 and the target object 140.

The light beams radiated onto the reference mirror 130 and the target object 140 are reflected therefrom and returned to the polarization beam splitter, and the reference light reflected from the reference mirror and the measurement light reflected from the target object are incident in the form of coherent light on the balanced optical cross-correlator 200 so that the time interval between the pulses can be precisely resolved. As such, in order to offset the increased width of the pulses resulting from dispersion in the air or medium, a prism pair, a diffraction grating pair, or optical fibers for compensating for the dispersion may be used. Thereby, the increased width of the pulses attributed to the dispersion in the medium may be offset, thus reducing the pulse width.

Figure 2:
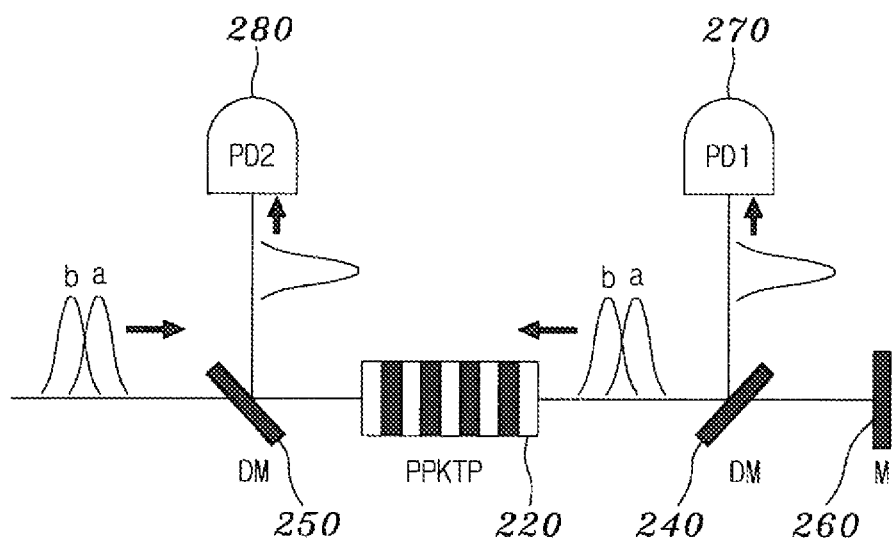
FIG. 2 is a view showing the principle of a balanced optical cross-correlator of the distance measurement device according to the present invention.
Figure 3:
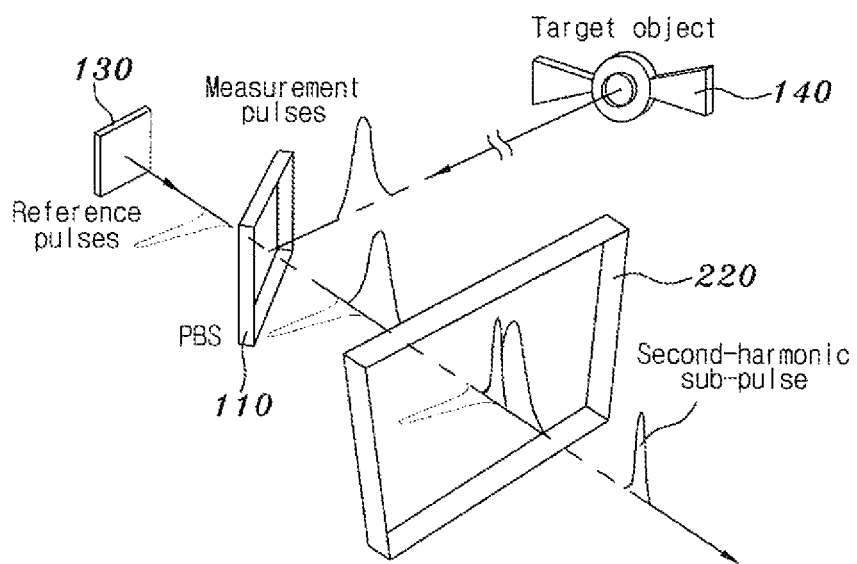
FIG. 3 is a view showing a process of generating second harmonic pulses using a second harmonic generator of the balanced optical cross-correlator of the distance measurement device according to the present invention.

FIG. 2 shows the principle of the balanced optical cross-correlator of the distance measurement device according to the present invention, and FIG. 3 shows the process of generating second harmonic pulses using the second harmonic generator of the optical cross-correlator of the distance measurement device according to the present invention.

The second harmonic generator provided to the optical cross-correlator 200 comprises a PPKTP (Periodically Poled Potassium Titanyl Phosphate) 220 which is a second harmonic generation crystal, and the optical cross-correlator includes a first condensing lens 210 and a second condensing lens 230 provided at both sides of the PPKTP with respect to a coherent light incidence pathway, a first photodetector 270 for detecting the generated second harmonic pulse, a mirror 260 for back-reflecting the light passed through the PPKTP to generate a second harmonic pulse, and a second photodetector 280 for detecting the second harmonic pulse generated through the PPKTP by being back-reflected by means of the mirror. Further, in order to reflect only the generated second harmonic pulses, a first dichroic mirror 240 and a second dichroic mirror 250 are provided at both sides of the PPKTP. According to an embodiment of the present invention, the PPKTP is a PPKTP that is 4 mm long having a quasi phase matching bandwidth of 100 nm so as to be adapted for the balanced optical cross-correlator.

Figure 4:
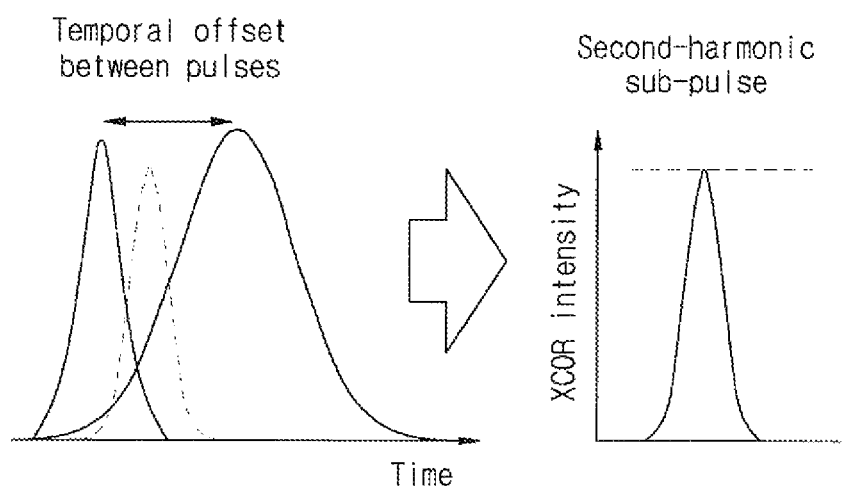
FIG. 4 is a view showing the form of the second harmonic pulse resulting from overlapping pulses using the second harmonic generator according to the present invention.

FIG. 4 is a graph showing the output signal that was balanced by means of the optical cross-correlator according to the present invention. The reference light and the measurement light which are orthogonal to each other, as a result of passing the light through the polarization beam splitter, are condensed via the first condensing lens 210 provided on the front of the balanced optical cross-correlator and are then incident on the PPKTP to generate the second harmonic pulse.

As such, the second harmonic pulse is produced in proportion to the degree the pulses of the reference light and the measurement light overlap. Useful as the second harmonic generation crystal, PPKTP (periodically poled potassium titanyl phosphate) has different group velocities in the crystal depending on the polarization state. As shown in FIG. 2, in the case where a pulse in the polarization state 'a' goes ahead upon a first pass, a pulse in the polarization state 'b' goes ahead because of the difference in group velocity of the crystal upon a second pass. Because the difference in intensity of the second harmonic pulses respectively incident on the balanced first and second photodetectors is output, if a time difference between incident two pulses corresponds to half the group delay in the crystal in interferometry, the time difference between two pulses upon a first pass is exactly equal to the time difference between two pulses upon a second pass, so that the intensities of second harmonic pulses resulting from the two pulses upon a first pass and a second pass are exactly equal to each other, thus outputting the signal 0. If the pulse in the polarization state 'a' goes ahead by at least half the group delay compared to the pulse in the polarization state 'b', an output signal larger than 0 is obtained. In contrast, if the pulse in the polarization state 'a' goes ahead by less than half the group delay or the pulse in the polarization state 'b' goes ahead instead, a negative signal may result. Thus, the output of the balanced photodetectors is depicted in an "S" shape as represented by the full line of FIG. 5 depending on the time difference between two pulses.

Figure 5:
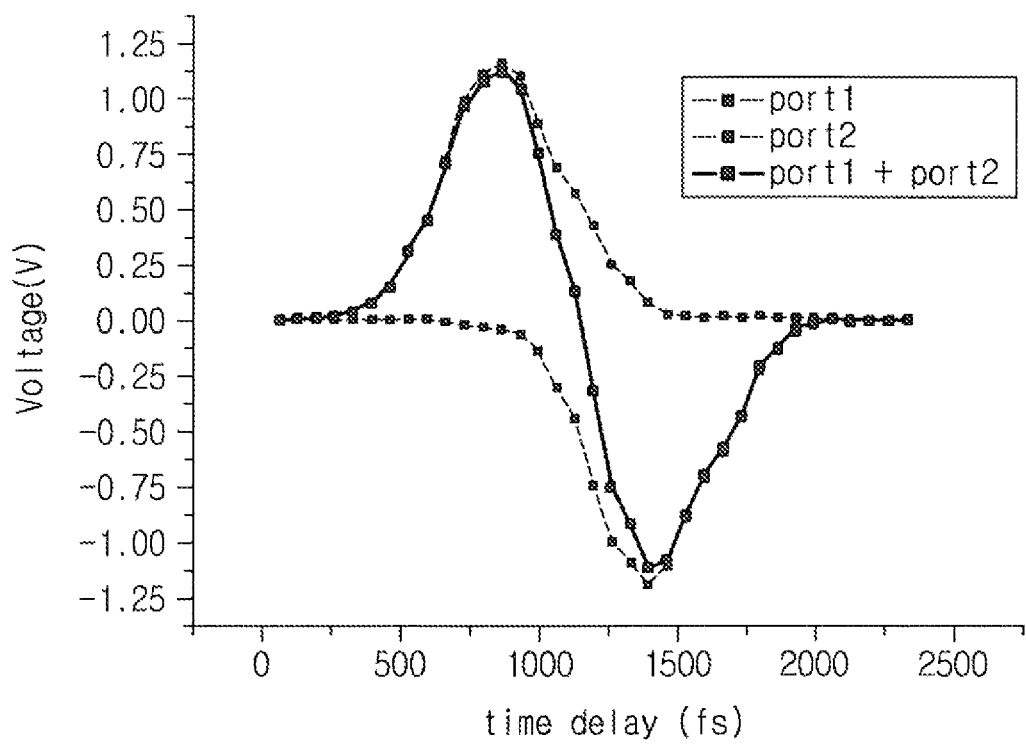
FIG. 5 is a graph showing a balanced output signal obtained by using the balanced optical cross-correlator according to the present invention.

FIG. 5 is a graph showing the balanced output signal resulting from using the optical cross-correlator according to the present invention. This graph is obtained by measuring the output signal of the balanced optical cross-correlator while the time interval between the reference light and the measurement light is regulated depending on migration of the target object. The portion represented by a dotted line is a curve of the signal output from the balanced first and second photodetectors, in which the time interval corresponds to a difference in group delay based on the difference in group velocity depending on the polarization state in the PPKTP, from which the two curves can be seen to separate from each other. The signal represented by a full line is an S-shaped curve corresponding to the difference between the two curves. As such, the gradient of the control signal for adjusting the repetition rate so that the output signal is locked is −6 mV/fs.

The interferometer structure of the distance measurement device according to the present invention is exemplified by a Michelson interferometer, in which two orthogonal polarized beams obtained by using the polarization beam splitter are respectively radiated onto and reflected from the reference mirror and the target object and are then incident on the balanced optical cross-correlator 200, so that the time interval between the pulses is measured. As such, in order to obtain the output signal using the balanced optical cross-correlator, two pulses reflected from the reference mirror and the target object should overlap, which is possible only after adjusting the repetition rate of the femtosecond laser by means of the controller 300. When the pulses are controlled so as to uniformly overlap, the repetition rate of the femtosecond laser is precisely measured using the frequency counter 310 traceable to a time/frequency standard after which the measured value is converted into distance information using the converter. The time tracing of the frequency counter is achieved by means of an atomic clock 330 provided thereto, thereby enabling the precise measurement.

In the present invention, the repetition rate of the femtosecond laser is adjusted so that the pulses overlap, after which the repetition rate of the light source is finely controlled. Thereby, as shown in FIG. 5, the output signal is locked in the portion corresponding to 0 of the S-shaped curve represented by a full line. The difference in distance between the reference mirror and the target object may be calculated by measuring the repetition rate of the light source, and is represented by Equation 1 below.

$$\Delta L = m \frac{c}{2 f_r N}$$ [Equation 1]

In Equation 1, ΔL is the difference in distance of two mirrors (including reference mirror and target object), c is the speed of light, $f_r$ is the repetition rate of a light source, and N is the group velocity of air.

Because pulses are continuously emitted from the light source, even when two pulses reflected from the reference mirror and the measurement mirror overlap, ambiguity is proportional to the increase in the measurement distance. To solve this problem, it is necessary that the value 'm' of Equation 1 be determined. This may be determined from changes in time interval between the pulses depending on the measurement distance upon adjusting the repetition rate in order to overlap the pulses.

$$2\Delta L/c = m/f_{r1} - \Delta t_1$$

$$2\Delta L/c = m/f_{r2} - \Delta t_2$$ [Equation 2]

In Equation 2, $f_{r1}$ and $f_{r2}$ are the values before and after adjusting the repetition rate, $\Delta t_1$ and $\Delta t_2$ are the time intervals between the pulses before and after adjusting the repetition rate, respectively. As such, the time measurement between the pulses to determine the value 'm' may be sufficiently carried out using a typical photodetector the reaction time of which is on the order of ones of ns. The distance measurement device including the balanced optical cross-correlator 200 according to the present invention accomplishes a distance measurement resolution of ones of μm or less under the condition that the time interval between two pulses is locked in the level of ones of fs. Within the measurement range, the time interval between two pulses reflected from the reference mirror and the target object is measured using an incoherent method, and thus is not affected by the coherence of the light source, so that there is no theoretical limitation imposed on the maximum measurement distance.

Furthermore, because the signal difference is detected from respective light elements of the balanced photodetectors, this device is insensitive to intensity noise in measurement pulses or reference pulses, and the time interval between two pulses is locked in a predetermined value and thereby no cyclic error takes place. Moreover, there is no need to perform complicated post-treatment procedures to calculate the distance value from the measured value, thus rapidly adjusting the repetition rate, leading to real-time distance measurement.

As the distance measurement device according to the present invention adopts an incoherent principle, the measurement distance thereof is not limited, and it may have a distance measurement resolution of 1 μm or less, and is insensitive to intensity noise of reference pulses and measurement pulses, generates no cyclic error, and enables real-time distance measurement by rapidly adjusting the repetition rate without performing complicated post-treatment procedures.

As described hereinbefore, the present invention provides a high resolution time-of-flight distance measurement device based on a femtosecond laser. According to the present invention, the distance measurement device based on a femtosecond laser using a balanced optical cross-correlator has no limitations imposed on the measurement distance and can achieve a distance measurement resolution of 1 μm or less because an incoherent principle is used.

Also, according to the present invention, the distance measurement device is insensitive to intensity noise of reference pulses and measurement pulses, generates no cyclic error, and enables real-time distance measurement by rapidly adjusting the repetition rate without performing complicated post-treatment procedures.

In addition to the distance measurement, according to the present invention, the distance measurement device can analyze spectral information from changes in the spectrum of a light source by means of a target or a medium through which the light source passes, and can be very advantageously applied to a variety of industrial fields, including measuring the concentration distribution of contaminants in the air and the sea, accurate weather forecasting, measuring tree and reproduction distribution, etc.

Although the embodiments of the present invention have been disclosed for illustrative purposes, those skilled in the art will appreciate that a variety of different modifications, additions and substitutions are possible, without departing from the scope and spirit of the invention as disclosed in the accompanying claims. Accordingly, such modifications, additions and substitutions should also be understood as falling within the scope of the present invention.

What is claimed is:

1. A high resolution time-of-flight distance measurement device based on a femtosecond laser, comprising:
    a femtosecond laser light source for emitting a femtosecond pulse laser;
    a polarization beam splitter for splitting light emitted from the femtosecond laser light source into reference light and measurement light having polarizations orthogonal to each other so that the reference light and the measurement light are directed to a reference mirror and a target object;
    a balanced optical cross-correlator on which the reference light reflected from the reference mirror and the measurement light reflected from the target object are incident in a form of coherent light and pass through a harmonic generator to thus generate second harmonic pulses, in which the second harmonic pulse that was primarily generated is incident on a first photodetector, and the second harmonic pulse that was secondarily generated by passing orthogonal light pulses back-reflected by a mirror through the harmonic generator is incident on a second photodetector, so that a difference in intensity of the second harmonic pulses incident on the first photodetector and the second photodetector is output, thus resolving a time interval of the pulse laser, wherein the orthogonal light pulses includes the reference light and the measurement light;
    a controller for controlling a repetition rate of the femtosecond laser to overlap laser pulses of the reference light reflected from the reference mirror and the measurement light reflected from the target object; and
    a converter for measuring the repetition rate of the femtosecond laser controlled so that the pulses uniformly overlap by means of the controller, using a frequency counter traceable to a time/frequency standard, so that a measured value is converted into distance information.

2. The high resolution time-of-flight distance measurement device of claim 1, which has a Michelson interferometer structure.

3. The high resolution time-of-flight distance measurement device of claim 1, wherein the balanced optical cross-correlator comprises:
    a first condensing lens and a second condensing lens provided at both sides of the harmonic generator so that the reference light and the measurement light, which were reflected, are condensed and then incident on the harmonic generator;
    a first dichroic mirror for separating the second harmonic pulse generated by the harmonic generator, so that it is directed to the first photodetector;
    a mirror for back-reflecting the light pulses passed through the first dichroic mirror to the harmonic generator; and
    a second dichroic mirror for separating the second harmonic pulse generated by passing the light pulses that were back-reflected by the mirror through the harmonic generator, so that it is directed to the second photodetector.

4. The high resolution time-of-flight distance measurement device of claim 1, wherein the harmonic generator comprises a PPKTP (Periodically Poled Potassium Titanyl Phosphate).

5. The high resolution time-of-flight distance measurement device of claim 1, wherein a difference in distance between the reference mirror and the target object is determined by an equation of $$\Delta L = m \frac{c}{2 f_r N}$$

wherein $\Delta L$ is the difference in distance between the reference mirror and the target object, c is a speed of light, $f_r$ is a repetition rate of a light source, and N is group velocity of air.

6. The high resolution time-of-flight distance measurement device of claim 1, wherein the frequency counter measures a frequency traceable to a time/frequency standard using an atomic clock.

7. The high resolution time-of-flight distance measurement device of claim 3, wherein the harmonic generator comprises Periodically Poled Potassium Titanyl Phosphate (PPKTP).

* * * * *